US012743598B2

(12) United States Patent
Tanaka et al.

(10) Patent No.: US 12,743,598 B2
(45) Date of Patent: Sep. 22, 2026

(54) INFORMATION PROCESSING SYSTEM AND METHOD FOR READING IMAGE TO DETERMINE DEFECTIVE IMAGE, NON-TRANSITORY COMPUTER READABLE MEDIUM STORING PROGRAM

(71) Applicant: FUJIFILM Business Innovation Corp., Tokyo (JP)

(72) Inventors: Yuki Tanaka, Kanagawa (JP); Shinya Miyamori, Kanagawa (JP); Shinsuke Sugi, Kanagawa (JP); Tomoya Oki, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 18/366,694

(22) Filed: Aug. 8, 2023

(65) Prior Publication Data

US 2024/0289579 A1 Aug. 29, 2024

(30) Foreign Application Priority Data

Feb. 27, 2023 (JP) ................................ 2023-028569

(51) Int. Cl.
*G06K 15/02* (2006.01)
*G06K 15/00* (2006.01)
(Continued)

(52) U.S. Cl.
CPC ......... *G06K 15/027* (2013.01); *G06K 15/007* (2013.01); *G06K 15/408* (2013.01);
(Continued)

(58) Field of Classification Search
None
See application file for complete search history.

(56) References Cited

U.S. PATENT DOCUMENTS 11,727,235 B2 * 8/2023 Murayama ........... G06K 15/408 358/1.14
2017/0318172 A1 11/2017 Matsuzaki
(Continued)

FOREIGN PATENT DOCUMENTS

JP 2007330970 12/2007
JP 2020120246 8/2020
(Continued)

OTHER PUBLICATIONS

"Search Report of Europe Counterpart Application", issued on Jan. 9, 2024, pp. 1-10.

*Primary Examiner* — Haris Sabah
(74) *Attorney, Agent, or Firm* — JCIPRNET

(57) ABSTRACT

An information processing system includes a processor configured to: acquire a read image that is an image obtained in a manner that an image reading section reads a diagnosis image of a recording medium, which is output by an image forming section, the read image including a first range that is a range of the recording medium and a second range that is a range extending from the first range in a reading direction of the image reading section; and generate a screen including information regarding the image forming section in a case where a defective image is in the first range as a result of diagnosing the acquired read image, and including information regarding the image reading section in a case where the defective image is in the second range as the result of diagnosing the acquired read image.

20 Claims, 12 Drawing Sheets

(51) Int. Cl.
*G06T 7/00* (2017.01)
*H04N 1/10* (2006.01)

(52) U.S. Cl.
CPC .............. *G06T 7/0004* (2013.01); *G06T 7/00* (2013.01); *G06T 2207/10008* (2013.01); *G06T 2207/10024* (2013.01); *G06T 2207/30144* (2013.01); *H04N 1/1017* (2013.01)

(56) References Cited

U.S. PATENT DOCUMENTS

| | | | | |
|---|---|---|---|---|
| 2020/0191339 | A1* | 6/2020 | Goutain | B82Y 20/00 |
| 2020/0236225 | A1 | 7/2020 | Hongo et al. | |
| 2021/0152706 | A1 | 5/2021 | Yoshida | |
| 2022/0291618 | A1* | 9/2022 | Yamazaki | G03G 15/5041 |
| 2022/0311908 | A1* | 9/2022 | Watanabe | H04N 1/00087 |
| 2023/0033553 | A1* | 2/2023 | Genda | H04N 1/0009 |

FOREIGN PATENT DOCUMENTS

| | | |
|---|---|---|
| JP | 2020182415 | 11/2020 |
| JP | 7124726 | 8/2022 |

* cited by examiner

READING DIRECTION
30
31
32
32
42
41
43
(a)
31
32
42
43
41
(b)

300
50
310
54
42
43
41
53
52
STREAK DETECTION REGION
42
41
51
30

300
310
50
30
41
42
52
STREAK DETECTION REGION
51
53
54
55
55a
55b
STREAK HAVING PROBABILITY OF PRINTER ABNORMALITY
41
42
43
56
56a
56b
STREAK HAVING PROBABILITY OF SCANNER ABNORMALITY

| | DETERMINATION RESULT | SINGLE-SIDED PRINTING | | TWO-SIDED PRINTING | |
|---|---|---|---|---|---|
| | | ONE SIDE | OTHER SIDE | ONE SIDE | OTHER SIDE |
| FORM 1 | SCANNER STREAK (READING UNIT 131) | NO IMAGE | NO IMAGE | 30, 44 | 30 |
| FORM 2 | SCANNER STREAK (READING UNIT 133) | NO IMAGE | NO IMAGE | 30 | 30, 44 |
| FORM 3 | PRINTER STREAK (Y COLOR) | NO IMAGE | NO IMAGE | 30, 45 | 30, 45 |
| FORM 4 | PRINTER STREAK (INTERMEDIATE TRANSFER BELT 150) | 30, 44 | NO IMAGE | 30, 44 | 30, 44 |
| FORM 5 | PRINTER STREAK (SECONDARY TRANSFER TRANSPORT BELT 161) | 30 | NO IMAGE | 30, 44 | 30, 44 |

INFORMATION PROCESSING SYSTEM AND METHOD FOR READING IMAGE TO DETERMINE DEFECTIVE IMAGE, NON-TRANSITORY COMPUTER READABLE MEDIUM STORING PROGRAM

CROSS-REFERENCE TO RELATED APPLICATIONS

This application is based on and claims priority under 35 USC 119 from Japanese Patent Application No. 2023-028569 filed Feb. 27, 2023.

BACKGROUND

(i) Technical Field

The present invention relates to an information processing system, a non-transitory computer readable medium storing a program, and an information processing method.

(ii) Related Art

For example, JP2020-120246A discloses a configuration as follows. An image forming section forms a test pattern on a first recording medium and a second recording medium having a size smaller than the first recording medium while long sides of the first recording medium and the second recording medium coincide with a transport direction. An image reading section acquires first diagnosis target data obtained by reading the first recording medium and second diagnosis target data obtained by rotating the second recording medium to have the long side that is in a different direction from the long side of the first recording medium and then reading the second recording medium. An abnormal portion is detected and an abnormality factor is diagnosed, by using the test pattern, the first diagnosis target data, the second diagnosis target data, and third diagnosis target data obtained by rotating the second diagnosis target data so that the long side of the second recording medium is in the same direction as the long side of the first recording medium.

SUMMARY

Here, in a case where an image that is formed on paper by the image forming section and read by a reading device is diagnosed, in an attempt to distinguish whether a defective image due to the diagnosis is caused by the image forming section or the reading section, for example, a plurality of read images with different reading directions are required, and thus it takes time and effort for a user to prepare the read images.

Aspects of non-limiting embodiments of the present disclosure relate to an information processing system, a non-transitory computer readable medium storing a program, and an information processing method that reduce the time and effort for a user to prepare a read image, as compared with a case where a diagnosis as to whether a defective image is caused by an image forming section or a reading section is performed by using a plurality of read images.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing system including a processor configured to acquire a read image that is an image obtained in a manner that an image reading section reads a diagnosis image of a recording medium, which is output by an image forming section, the read image including a first range that is a range of the recording medium and a second range that is a range extending from the first range in a reading direction of the image reading section, and generate a screen including information regarding the image forming section in a case where a defective image is in the first range as a result of diagnosing the acquired read image, and including information regarding the image reading section in a case where the defective image is in the second range as the result of diagnosing the acquired read image.

BRIEF DESCRIPTION OF THE DRAWINGS

Exemplary embodiment(s) of the present invention will be described in detail based on the following figures, wherein:

FIG. 11 is a diagram illustrating an image forming apparatus according to a second exemplary embodiment; and FIG. 12 is a table showing determination results of defective images, and illustrates a defective image generation form in which a defective image is generated in each of a case of single-sided printing and a case of two-sided printing.

DETAILED DESCRIPTION

Hereinafter, exemplary embodiments of the present invention will be described with reference to the accompanying drawings.

Figure 1:
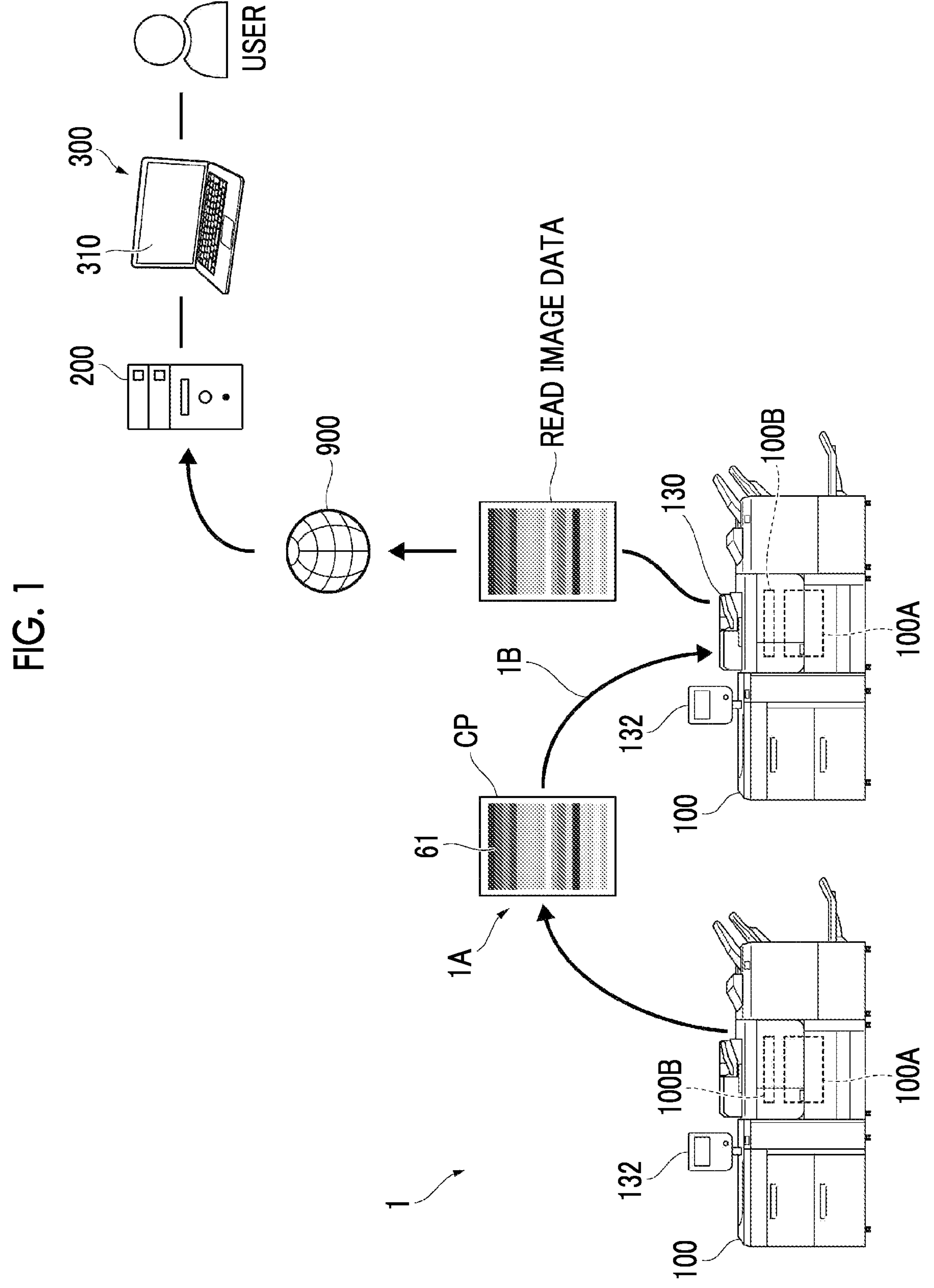
FIG. 1 is a diagram illustrating an example of a diagnosis system.

FIG. 1 is a diagram illustrating an example of a diagnosis system.

The diagnosis system 1 according to the present exemplary embodiment is provided with a plurality of image forming apparatuses 100 and a server apparatus 200 that is connected to each of the plurality of image forming apparatuses 100 via a communication line 900. In the present exemplary embodiment, in the server apparatus 200 as an example of an information processing system and an example of an information processing apparatus, diagnosis of each image forming apparatus 100 is performed.

Further, the diagnosis system 1 in the present exemplary embodiment is provided with a user terminal 300 that is connected to the server apparatus 200 and receives an operation from a user.

In FIG. 1, two image forming apparatuses 100 among a plurality of image forming apparatuses 100 are displayed.

The user terminal 300 is provided with a display device 310. The user terminal 300 is realized by a computer. Examples of the form of the user terminal 300 include a personal computer (PC), a smartphone, and a tablet terminal.

The image forming apparatus 100 is provided with an image forming unit 100A as an example of an image forming section that forms an image on paper which is an example of a recording medium.

For example, the formation of an image on paper by the image forming unit 100A is performed by an inkjet method or an electrophotographic method. In addition, the formation of an image on paper by the image forming unit 100A is not limited to the inkjet method or the electrophotographic method, but may be performed by other methods.

The image forming apparatus 100 is further provided with an information processing unit 100B. The information processing unit 100B executes various processes executed in the image forming apparatus 100.

Figure 2:
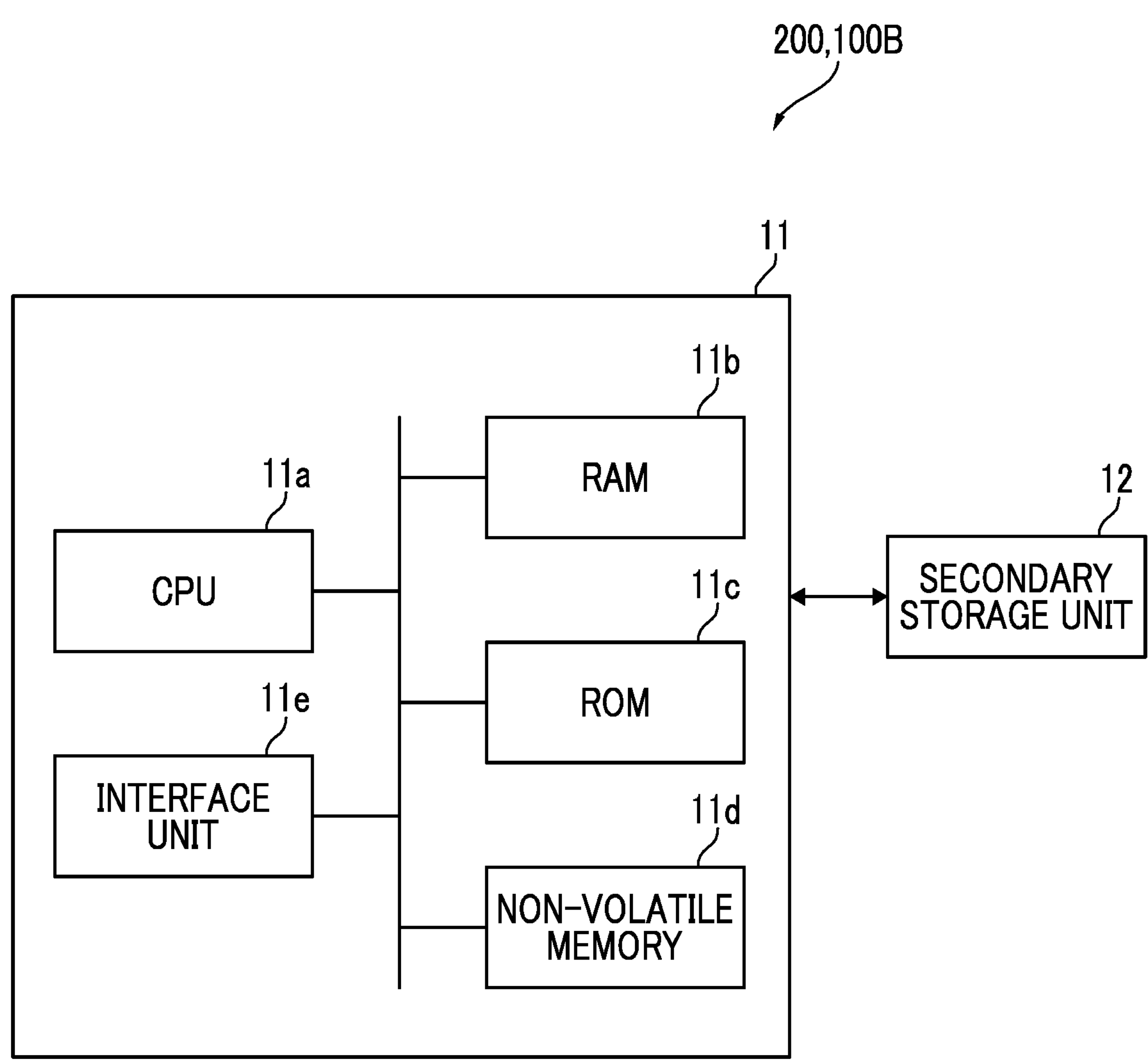
FIG. 2 is a diagram illustrating an example of a hardware configuration of an information processing unit provided in a server apparatus and an image forming apparatus.

FIG. 2 is a diagram illustrating an example of a hardware configuration of the information processing unit 100B provided in the server apparatus 200 and the image forming apparatus 100. The information processing unit 100B provided in the server apparatus 200 and the image forming apparatus 100 is realized by a computer.

Each of the server apparatus 200 and the information processing unit 100B includes an arithmetic processing unit 11 that executes a digital arithmetic process according to a program, and a secondary storage unit 12 that stores information.

The secondary storage unit 12 is realized, for example, by a known information storage device such as a hard disk drive (HDD), a semiconductor memory, or a magnetic tape.

The arithmetic processing unit 11 is provided with a CPU 11*a* as an example of a processor.

In addition, the arithmetic processing unit 11 is provided with a RAM 11*b* used as a working memory or the like of the CPU 11*a* and a ROM 11*c* in which programs or the like executed by the CPU 11*a* are stored.

In addition, the arithmetic processing unit 11 is provided with a non-volatile memory 11*d* that is configured to be rewritable and can hold data even in a case in which power supply is interrupted and an interface unit 11*e* that controls each unit, such as a communication unit, connected to the arithmetic processing unit 11.

The non-volatile memory 11*d* is configured by, for example, an SRAM or a flash memory that is backed up by a battery. The secondary storage unit 12 stores the programs executed by the arithmetic processing unit 11 in addition to files and the like.

In the present exemplary embodiment, the arithmetic processing unit 11 reads the program stored in the ROM 11*c* or the secondary storage unit 12 to perform each process.

The program executed by the CPU 11*a* can be provided to the server apparatus 200 and the information processing unit 100B in a state in which the program is stored in a computer-readable recording medium such as a magnetic recording medium (for example, a magnetic tape or a magnetic disk), an optical recording medium (for example, an optical disk), a magneto-optical recording medium, or a semiconductor memory. Further, the program executed by the CPU 11*a* may be provided to the server apparatus 200 and the information processing unit 100B by a communication unit such as the Internet.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The process executed by the image forming apparatus 100 among the processes described below is executed by the CPU 11*a* as an example of the processor provided in the image forming apparatus 100.

The process executed by the server apparatus 200 among the processes described below is executed by the CPU 11*a* as an example of the processor provided in the server apparatus 200.

Further, the process for diagnosing the image forming apparatus 100 among the processes described below is executed by the server apparatus 200 as an example of the information processing system. The information processing system that executes the process for diagnosing the image forming apparatus 100 may be realized by one apparatus such as one server apparatus 200, or may be realized by a plurality of apparatuses.

Figure 3:
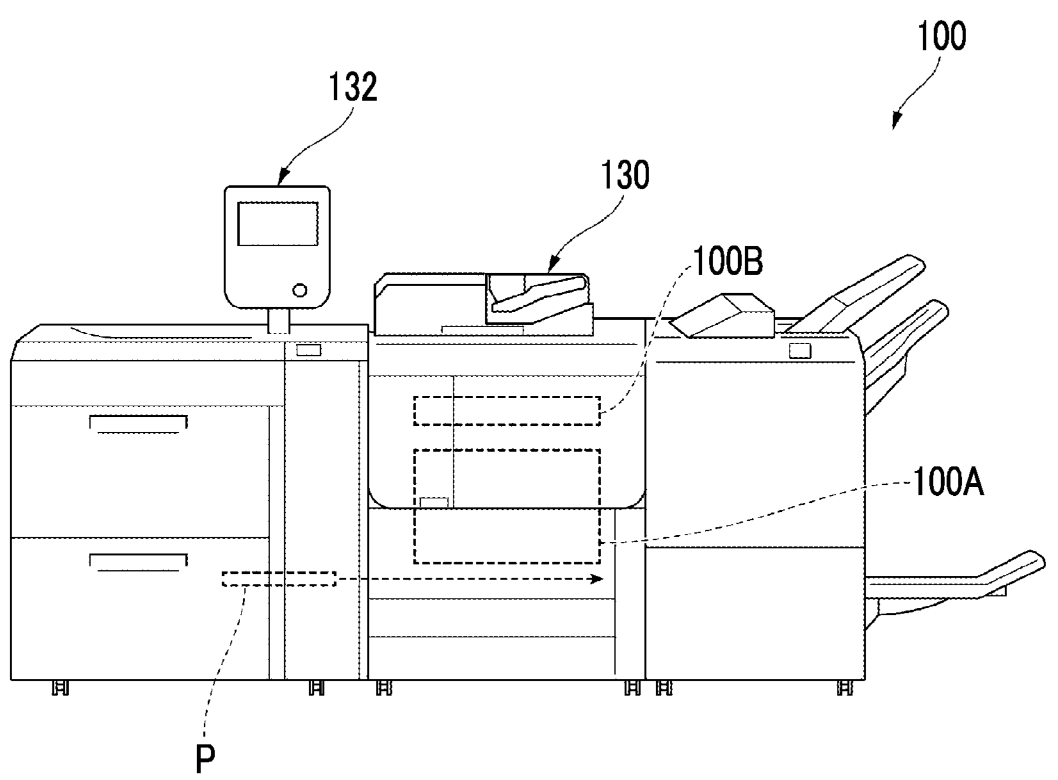
FIG. 3 is a diagram illustrating the image forming apparatus.

FIG. 3 is a diagram illustrating the image forming apparatus 100.

In the present exemplary embodiment, as described above, the image forming apparatus 100 is provided with the image forming unit 100A that forms an image on paper P which is an example of a recording medium.

In the present exemplary embodiment, in a case where the paper P passes through the image forming unit 100A, the paper P passes through the image forming unit 100A in a state where one side of the paper P faces the image forming unit 100A.

Further, the image forming apparatus 100 is provided with an image reading device as an example of an image reading section that reads an image formed on a recording medium such as paper P.

Such an image reading device 130 is a so-called scanner having a function of transporting the paper P. The image reading device 130 includes a light source that emits light to paper P and a light receiving unit such as a CCD, that receives reflected light from the paper P. In the present exemplary embodiment, read image data described later is generated based on the reflected light received by the light receiving unit.

A reading position of an image is set in advance in the image reading device 130, and the image reading device 130 reads an image at a portion of paper P that is sequentially transported, which is located at the reading position.

The image forming apparatus 100 has an information transmission function of transmitting information to the server apparatus 200 (see FIG. 1).

In the example illustrated in FIG. 3, the image reading device 130 is provided above the image forming apparatus 100. The image reading device 130 sequentially reads paper (not illustrated) set by the user. The paper is not limited to paper on which an image is formed by the image forming apparatus 100, and may be paper on which an image is formed by another image forming apparatus.

An installation form of the image reading device 130 is not limited to the form illustrated in FIG. 3. The image reading device 130 may be provided inside the image forming apparatus 100 and on a transport path of paper P.

In this case, the paper P on which an image is formed by the image forming unit 100A sequentially passes through the image reading device 130, and at the time of passing through the paper P, each image of the paper P is read in order.

In the present exemplary embodiment, the image reading device 130 is provided with a paper reversing mechanism so that the paper can be supplied after the front and back sides have been reversed with respect to the reading position of the image.

Thus, in the present exemplary embodiment, the paper on which an image formed on one side is read can be reversed and supplied to the reading position again. As a result, images on the front and back sides of the paper can be read.

In addition, in reading an image on paper, the paper is placed on a platen (not illustrated) configured by plate-shaped glass or the like so that the paper placed on the platen may be read.

Further, each image forming apparatus 100 is provided with an operation reception unit 132 that receives an operation from the user. The operation reception unit 132 is configured by a so-called touch panel. The operation reception unit 132 displays information for the user and receives an operation performed by the user.

The display of information for the user and the reception of the operation by the user are not limited to being performed by one operation reception unit 132 as in the present exemplary embodiment. The operation reception unit and the information display unit may be provided separately.

In the present exemplary embodiment, in a case in which the image forming apparatus 100 (see FIG. 1) is diagnosed, first, the image forming unit 100A is operated to form a chart image on paper P. Thus, as indicated by the reference sign 1A in FIG. 1, chart paper CP which is the paper on which a chart image that is an example of a diagnosis image has been formed is generated.

A chart image 61 is an image used to diagnose the image forming apparatus 100. In the present exemplary embodiment, the chart paper CP which is the paper P on which the chart image 61 used for the diagnosis has been formed is generated.

In a case where the chart paper CP is generated, the chart paper CP is installed on the image reading device 130 as indicated by the reference sign 1B in FIG. 1. The image reading device 130 is used to read the chart paper CP on which the chart image 61 is formed.

As a result, read image data obtained by reading the chart paper CP is generated.

In the present exemplary embodiment, the read image data is transmitted to the server apparatus 200 and then is stored in the server apparatus 200. The server apparatus 200 diagnoses the image forming apparatus 100 based on the read image data.

In the present exemplary embodiment, a user who uses the diagnosis system 1 in the present exemplary embodiment, such as a maintainer who maintains the image forming apparatus 100, accesses the server apparatus 200 and refers to the result of the diagnosis by the server apparatus 200.

In each image forming apparatus 100, as described above, the chart paper CP is generated and the chart paper CP is read, and thus the read image data is generated.

Such read image data is transmitted to the server apparatus 200. As described above, in the present exemplary embodiment, the server apparatus 200 diagnoses the image forming apparatus 100.

A diagnosis process executed by the server apparatus 200 will be described.

In the present exemplary embodiment, the CPU 11*a* (see FIG. 2) as an example of the processor provided in the server apparatus 200 diagnoses the image forming apparatus 100 based on the above-described read image data transmitted from the image forming apparatus 100, and then acquires the diagnosis result which is the result of the diagnosis.

More specifically, the CPU 11*a* acquires a diagnosis result for each of a plurality of diagnostic items, which is a diagnosis result for the chart image 61 that is the image formed on the chart paper CP.

In the present exemplary embodiment, a plurality of diagnostic items are predetermined. The CPU 11*a* in the server apparatus 200 analyzes the chart image 61 included in the read image data, and acquires a diagnosis result for each of the plurality of diagnostic items.

More specifically, for example, the CPU 11*a* in the server apparatus 200 acquires the diagnosis result for each of the diagnostic items based on a difference between the reference value predetermined for each of the plurality of diagnostic items and the value obtained by analyzing the chart image 61.

The CPU 11*a* in the server apparatus 200 acquires a diagnosis result having a worse evaluation as the difference increases.

Then, the CPU 11*a* rearranges a plurality of acquired diagnosis results so that the plurality of acquired diagnosis results are arranged in a predetermined order.

More specifically, in rearranging the plurality of diagnosis results, the CPU 11*a* rearranges a plurality of the diagnosis results so that, for example, a plurality of the diagnosis results are arranged in an order of a bad evaluation or a good evaluation.

Then, the CPU 11*a* generates a screen in which the plurality of diagnosis results are arranged in a predetermined order.

Next, a configuration for, in a case where a defect is determined in the diagnosis result, distinguishing whether the defect is caused by the image forming unit 100A (see FIG. 3) that forms an image on paper or caused by the image reading device 130 (see FIG. 3) that reads an image on the paper will be described. Such a configuration is realized by the image reading device 130 and the CPU 11*a* in the image forming apparatus 100.

Figure 4:
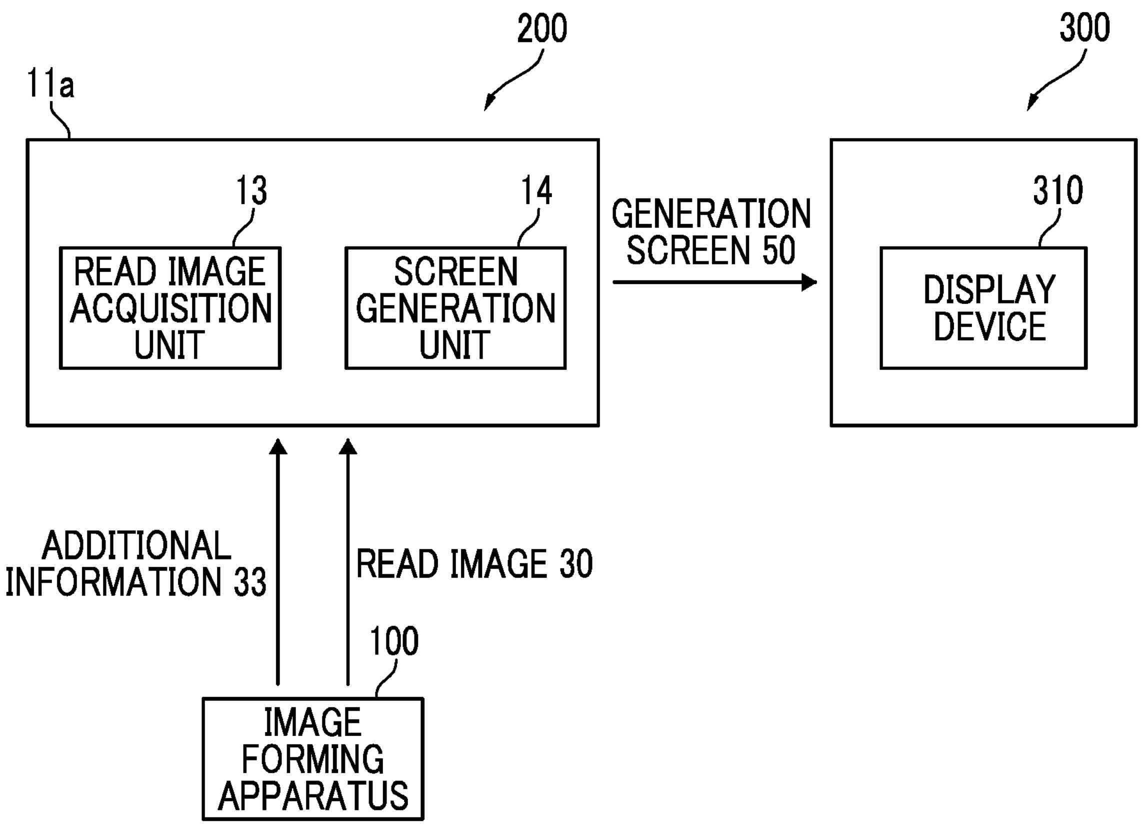
FIG. 4 is a block diagram illustrating a functional configuration of a CPU in the image forming apparatus.

FIG. 4 is a block diagram illustrating a functional configuration of the CPU 11*a* provided in the server apparatus 200, and also illustrates the image forming apparatus 100 and the user terminal 300 for easy description.

As illustrated in FIG. 4, the CPU 11*a* in the server apparatus 200 includes a read image acquisition unit 13 and a screen generation unit 14.

The read image acquisition unit 13 acquires read image 30, which is an image read by the image reading device 130 (see FIG. 3), by transmission from the image forming apparatus 100. Further, in a case of acquiring the read image 30, the read image acquisition unit 13 acquires additional information 33 which is information indicating whether or not the read image 30 includes an out-of-paper image 32 (see FIG. 6) described later.

More specifically, the additional information 33 includes any one or a combination of model information of the image forming apparatus 100, model information of the image reading device 130, and information regarding the read image 30. As the information regarding the read image 30, for example, information indicating that the read image 30 includes or does not include the out-of-paper image 32 can be provided. In a case where information indicating that the read image 30 does not include the out-of-paper image 32 (see FIG. 6) is derived from the model information, the additional information 33 may include the model information of the image reading device 130 instead of the information regarding the read image 30. In other words, the additional information 33 may include at least one of the model information of the image reading device 130 or the information regarding the read image 30. Such additional information is an example of second range-included information.

In a case where the additional information includes the model information, it is possible to specify the related constituent component based on detected defective images 41 to 43 (see FIG. 6), in a case where the defective image is a printer streak.

The screen generation unit 14 generates a screen for notifying the user of the result of the diagnosis performed based on the acquired read image 30. The user is notified of a generation screen 50, which is the generated screen, in a manner that the generation screen 50 is transmitted from the server apparatus 200 to the user terminal 300, and then is displayed on the display device 310 of the user terminal 300.

First Exemplary Embodiment

Next, the configuration of the image reading device 130 according to a first exemplary embodiment will be described with reference to FIG. 5.

Figure 5:
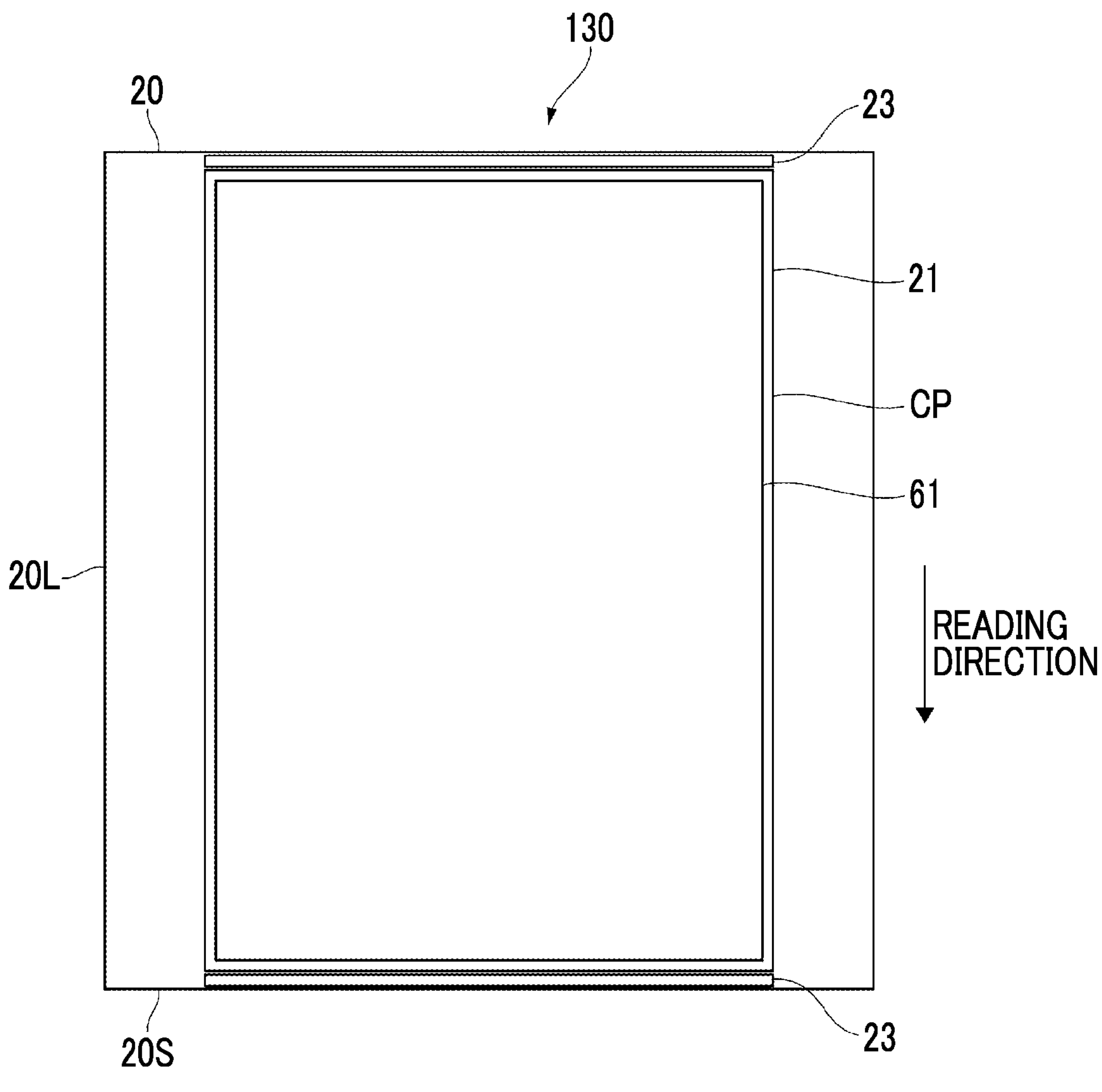
FIG. 5 is a diagram illustrating a reading region provided in an image reading device according to a first exemplary embodiment.

FIG. 5 is a diagram illustrating a reading region 20 provided in the image reading device 130.

The reading region 20 illustrated in FIG. 5 includes an in-paper region 21 which is a region for reading paper such as chart paper CP, and an out-of-paper region 23 which is a region outside the in-paper region 21. The chart paper CP is an example of a recording medium, and the chart image 61 is an example of a diagnosis image.

The in-paper region 21 is an outer shape corresponding to the size of the chart paper CP, and is a region having a size required for reading the chart image 61 of the chart paper CP.

The out-of-paper region 23 refers to a region located in a reading direction in the reading region 20 with respect to the in-paper region 21. The out-of-paper region 23 includes two portions, a portion located on the front side and a portion located on the rear side in the reading direction, but the present disclosure is not limited to this, and any one of the portions may be used.

In the reading region 20 in FIG. 5, the long side of the four sides of a rectangle is referred to as a long side 20L, and the short side is referred to as a short side 20S. The long side 20L and the short side 20S of the reading region 20 can be referred to as the long side and the short side of the in-paper region 21, and can be referred to as the long side and the short side of the out-of-paper region 23. Further, the long side 20L and the short side 20S can be referred to as the long side and the short side of the chart paper CP in a case where the chart paper CP is located in the in-paper region 21.

Next, the read image 30 which is an example of an image obtained by reading the chart paper CP (see FIG. 5) in the reading region 20 of the image reading device 130 will be described with reference to FIG. 6.

Figure 6:
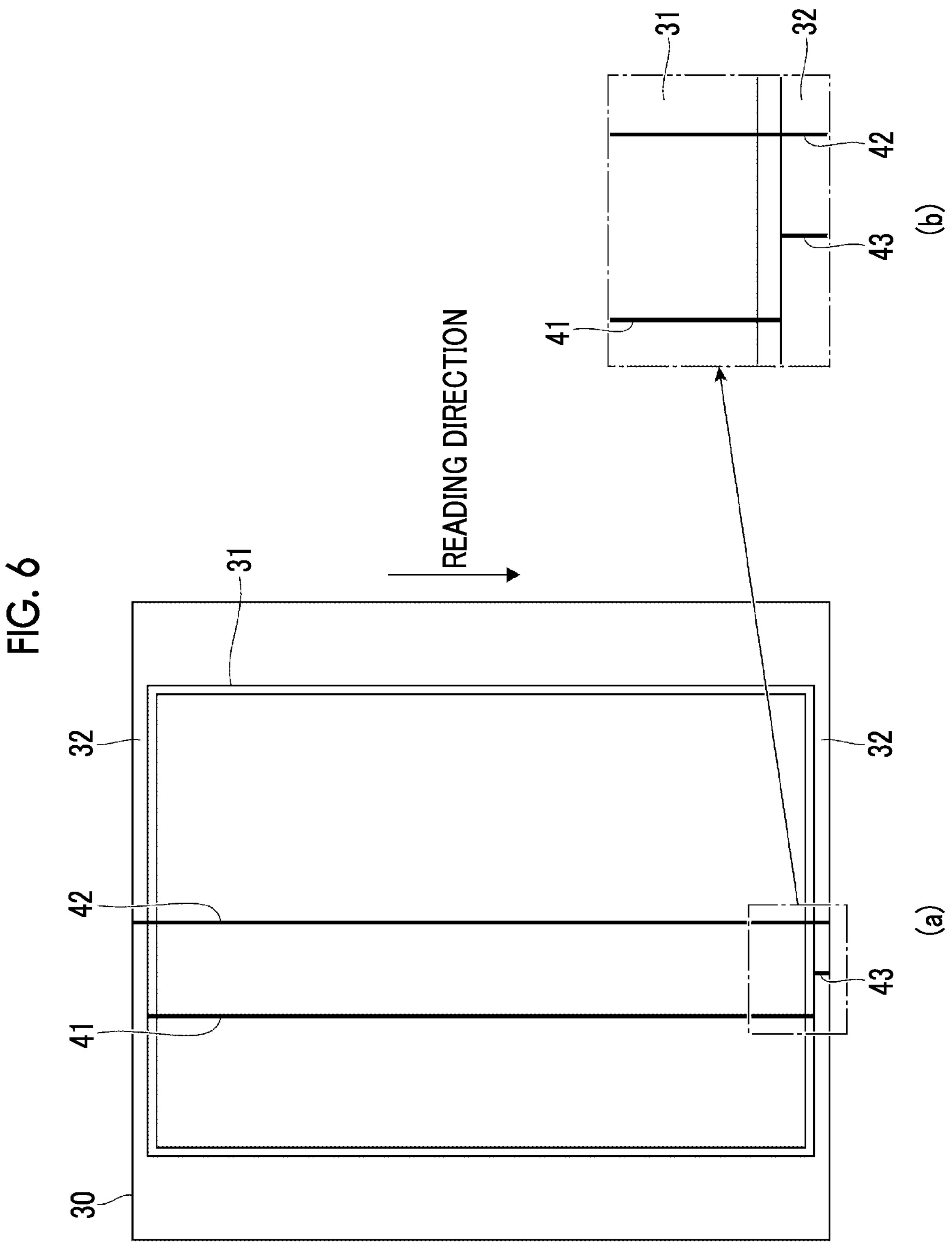
FIG. 6 is a diagram illustrating a read image, in which (a) of FIG. 6 is an enlarged view of the entire image, and (b) of FIG. 6 is an enlarged view of a portion of the entire image.

FIG. 6 is a diagram illustrating the read image 30. (a) of FIG. 6 is an enlarged view of the entire image, and (b) of FIG. 6 is an enlarged view of a portion of the entire image.

The read image 30 illustrated in (a) of FIG. 6 includes an in-paper image 31 formed corresponding to reading in the in-paper region 21 (see FIG. 5) and an out-of-paper image 32 formed corresponding to reading in the out-of-paper region 23 (see FIG. 5). The in-paper image 31 is an example of a first range, and the out-of-paper image 32 is an example of a second range.

The read image 30 illustrated in (a) of FIG. 6 includes the out-of-paper image 32. However, depending on the image forming apparatus 100, a case where a process of excluding the out-of-paper image 32 is performed on the read image 30, and only the in-paper image 31 is transmitted to the server apparatus 200 as the read image is also assumed. Further, a case where the out-of-paper image 32 is excluded from the read image 30 and only the in-paper image 31 is used as a transmission image to be transmitted to the server apparatus 200 is also assumed.

As illustrated in (b) of FIG. 6, defective images 41, 42, and 43 formed long in the reading direction appear in the read image 30. The defective images 41, 42, and 43 referred to here refer to images formed by some defects in image formation or image reading, and are, for example, streaky images.

In the present exemplary embodiment, since the read image 30 includes the in-paper image 31 and the out-of-paper image 32, it is possible to specify the cause of forming the defective images 41, 42, and 43 without using a plurality of read images including only the in-paper image 31. This will be described below.

Although the defective image 41 appears in the in-paper image 31, the defective image 41 does not appear in the out-of-paper image 32. Since the defective image 41 does not appear in the out-of-paper image 32, it is possible to determine that the defective image 41 is an image in which the so-called printer streaks are generated, and is generated in the case of image formation by the image forming unit 100A.

The defective image 42 appears in both the in-paper image 31 and the out-of-paper image 32. Therefore, it is possible to determine that the defective image 42 is an image in which the so-called scanner streaks are generated, and is generated in the case of image reading by the image reading device 130.

Although the defective image 43 does not appear in the in-paper image 31, the defective image 41 appears in the out-of-paper image 32. In this point, the defective image 43 is different from the defective image 41 that appears in the in-paper image 31 but does not appear in the out-of-paper image 32.

Since the defective image 43 does not appear in the in-paper image 31, the defective image 43 is not generated in the case of image formation by the image forming unit 100A. It is possible to determine that the defective image 43 is an image in which the scanner streaks are generated, and is generated in the case of image reading by the image reading device 130.

As described above, in the read image 30, the printer streaks are generated in the defective image 41 that does not appear in the out-of-paper image 32, and the scanner streaks are generated in the defective images 42 and 43 that appear in the out-of-paper image 32.

Here, in addition to a case where either one of the defective image 41 which is the printer streaks and the defective image 43 which is the scanner streaks appears in the read image 30, both the defective image 41 and the defective image 43 may appear in the read image 30.

More specifically, in a case where both the defective image 41 and the defective image 43 appear in the read image 30, there are a case where the defective image 41 and the defective image 43 appear at different positions in a direction intersecting the reading direction and a case where the defective image 41 and the defective image 43 appear at the same position.

As described above, in a case where the defective image 41 and the defective image 43 appear at the same position, the defective image 41 and the defective image 43 appear as one straight line. Thus, it is difficult to distinguish between the defective image 41 and the defective image 43, and the defective image 42 of the scanner streaks described above.

In addition, although the positions where the defective image 41 and the defective image 43 appear are different, in a case where there is a difference such that the defective image 41 and the defective image 43 appear as one straight line at first glance, it is difficult to make a highly accurate determination with the read image 30.

Figure 7:
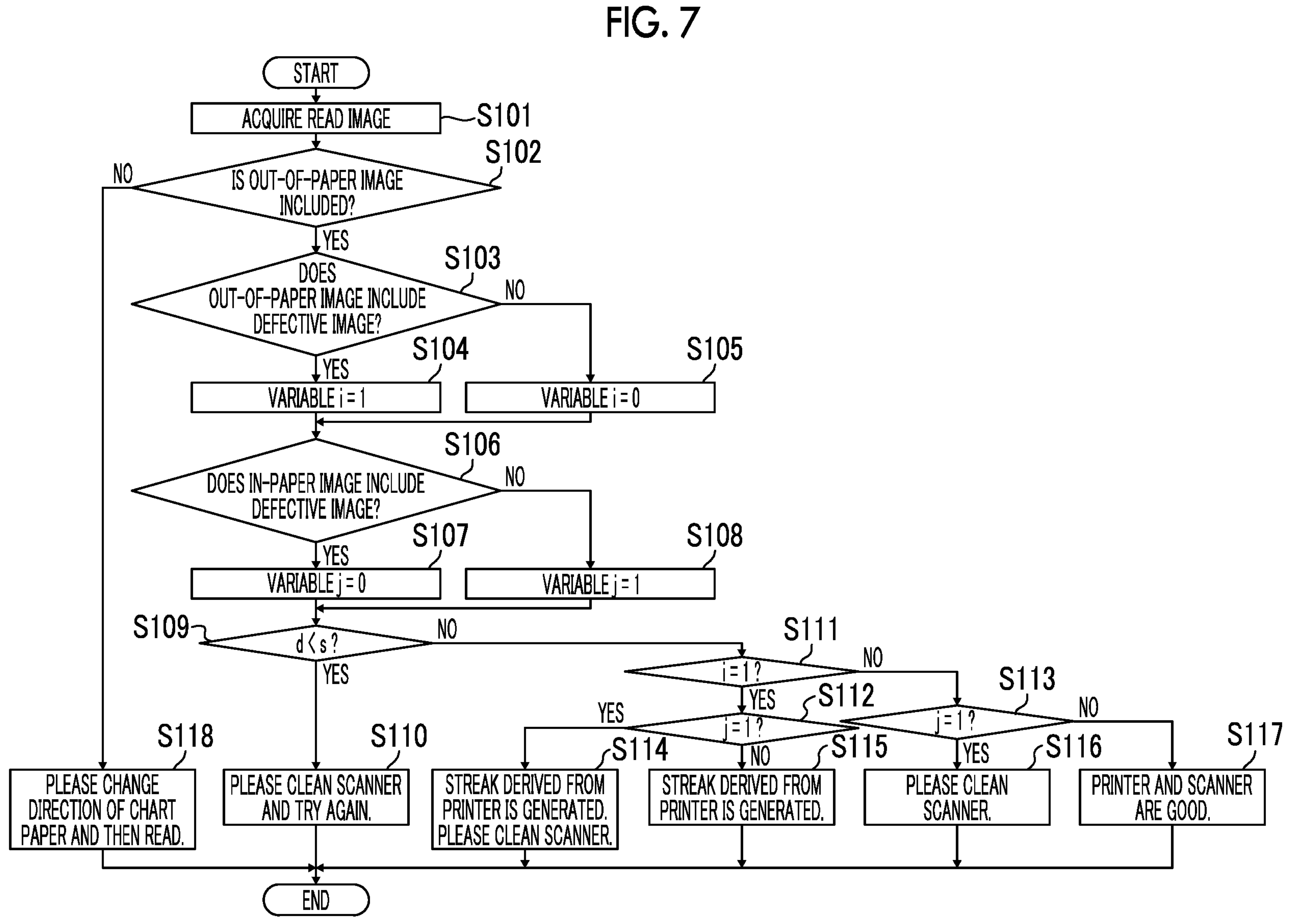
FIG. 7 is a flowchart illustrating an example of a processing procedure in the CPU of the server apparatus.

FIG. 7 is a flowchart illustrating an example of a processing procedure in the CPU 11*a* of the server apparatus 200.

In the example of the processing procedure illustrated in FIG. 7, in a case where the read image acquisition unit 13 (see FIG. 4) acquires the read image 30 from the image forming apparatus 100 (Step S101), the screen generation unit 14 (see FIG. 4) checks whether or not the acquired read image 30 includes the out-of-paper image 32 (Step S102). Such a check can be performed by the additional information 33 (see FIG. 4) acquired by the read image acquisition unit 13.

In a case where the read image 30 includes the out-of-paper image 32 (Yes in Step S102), the screen generation unit 14 next checks whether or not the out-of-paper image 32 has a defective image (Step S103). In a case where the out-of-paper image 32 includes a defective image (Yes in Step S103), 1 is set in a variable i indicating the presence or absence of the defective image in the out-of-paper image (Step S104). On the other hand, in a case where there is no defective image in the out-of-paper image 32 (No in Step S103), the variable i is set to 0 (Step S105).

Then, the screen generation unit 14 checks whether or not the in-paper image 31 has a defective image (Step S106). In a case where the in-paper image 31 has a defective image (Yes in Step S106), 1 is set in a variable j indicating the presence or absence of the defective image in the in-paper image (Step S107). On the other hand, in a case where there is no defective image in the in-paper image 31 (No in Step S106), the variable j is set to 0 (Step S108).

Then, in a case where 1 is set in both the variable i and the variable j (Yes in Step S103 and Yes in Step S106), that is, in a case where both the out-of-paper image 32 and the in-paper image 31 have a defective image, the screen generation unit 14 obtains a difference d between the position of the defective image in the out-of-paper image 32 and the position of the defective image in the in-paper image 31 with respect to the direction intersecting the reading direction. Then, the screen generation unit 14 checks (d<S?) whether or not the difference d is less than a threshold value S determined in advance (Step S109).

In a case where the difference d is less than the threshold value S (d<S) (Yes in Step S109), the screen generation unit 14 determines that it is difficult to perform the determination with high accuracy on the read image 30, and generates a screen including, for example, text that "please clean scanner and try again" (Step S110). That is, a screen having a message indicating that the image reading device 130 (see FIG. 3) is cleaned, and then image reading is performed again is generated. As described above, the screen in Step S110 includes information for prompting the image reading device 130 to perform reading.

The case where the difference d is less than the threshold value S (d<S) is a condition for defining the positional relationship between the defective images, and is an example of a case where a predetermined condition is satisfied.

In a case where the difference d is equal to or more than the threshold value S (d≥S) (No in Step S109), the screen generation unit 14 checks whether or not the variable i is 1 (i=1?) (Step S111).

In a case where the variable i is 1 (Yes in Step S111), the screen generation unit 14 checks whether or not the variable j is 1 (j=1?) (Step S112). In a case where the variable i is not 1 (No in Step S111), the screen generation unit 14 checks whether or not the variable j is 1 (j=1?) (Step S113).

In a case where the variable i and the variable j are 1 (Yes in Step S111 and Yes in Step S112), the screen generation unit 14 generates a screen including, for example, text that "streaks derived from the printer are generated. Please clean scanner" (Step S114).

In a case where the variable i is 1 and the variable j is 0 (Yes in Step S111 and No in Step S112), the screen generation unit 14 generates a screen including, for example, text that "streaks derived from the printer are generated" (Step S115).

In a case where the variable i is 0 and the variable j is 1 (No in Step S111, Yes in Step S113), the screen generation unit 14 generates a screen including, for example, text that "Please clean the scanner" (Step S116).

In a case where the variable i and the variable j are 0 (No in Step S111 and No in Step S113), the screen generation unit 14 generates a screen including, for example, text that "the printer and the scanner are good" (Step S117).

In a case where the read image 30 does not include the out-of-paper image 32 (No in Step S102), the screen generation unit 14 generates a screen including, for example, text that "please change the direction of the chart paper and then read" (Step S118).

In a case where the screens in Steps S110 and S114 to S118 are generated, the generated image is transmitted to the user terminal 300 and displayed on the display device 310 (for example, see FIG. 4) of the user terminal 300.

The screen according to Step S115 is an example of a screen including information regarding the image reading section, and the screen according to Step S116 is an example of a screen including information regarding the image forming section.

Here, it is conceivable to perform a control of omitting the display of the screen having a message indicating that the defective images 41 to 43 are derived from the scanner, among the screens in Steps S114 to 117. That is, the control in which the screen is generated only in the case of the streaks derived from the printer, and the screen in Step S116 is not displayed is performed. On the other hand, since the screen in Step S114 may have a streak derived from the printer, a control for displaying the screen may be adopted.

As described above, in a case where there is no probability of the streak derived from the printer and there is a probability of the streak derived from the scanner, the operation guidance for the scanner will be omitted. The case where there is no probability of the streak derived from the printer is an example of a predetermined case. The case where there is a probability of the streak derived from the scanner is an example of a case where there is a defective image in the out-of-paper region 23.

Figure 8:
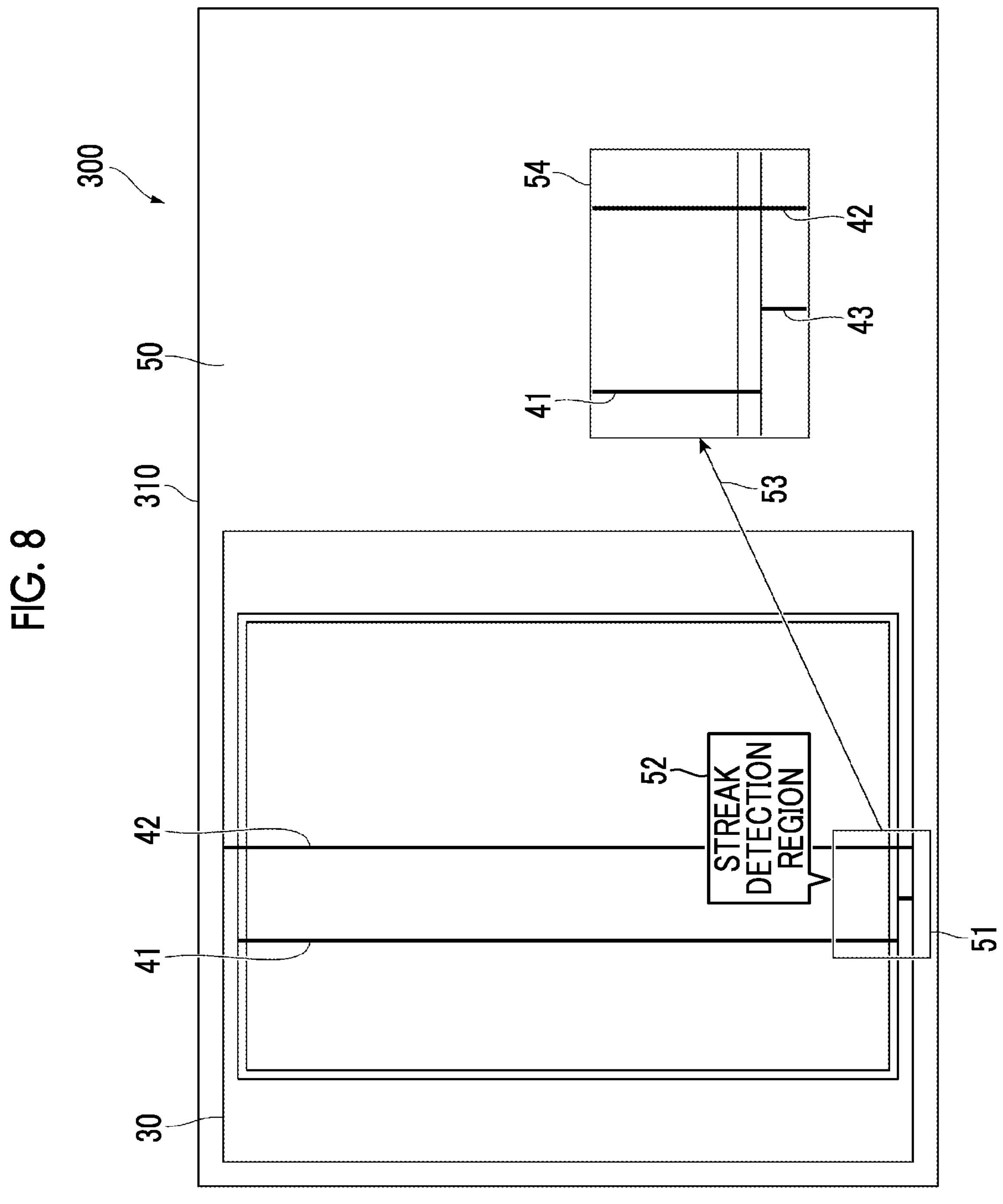
FIG. 8 is a diagram illustrating an example of a generation screen displayed on a display device of a user terminal.

FIG. 8 is a diagram illustrating an example of a generation screen 50 displayed on the display device 310 of the user terminal 300.

The generation screen 50 of the display device 310 illustrated in FIG. 8 includes the read image 30, and a frame portion 51 indicating a portion including the defective images 41 to 43 in the read image 30 and text 52 "streak detection region" are displayed on the generation screen 50.

Further, the generation screen 50 includes an arrow 53 suggesting that the image located on the right side of the read image 30 is an enlarged image of the frame portion 51, and an enlarged display portion 54 displaying the frame portion 51 in an enlarged manner. It can be visually recognized that the defective images 41 to 43 are displayed on the enlarged display portion 54.

As described above, as illustrated in FIG. 8, the generation screen 50 includes a partial image in order to clearly present the grounds for the existence of the defective images 41 to 43 in addition to the read image 30.

Only the generation screen 50 in which the frame portion 51 and the text 52 are added to the read image 30 is assumed, and the enlarged display portion 54 may be omitted. The visibility of the user is improved by including the enlarged display portion 54.

Figure 9:
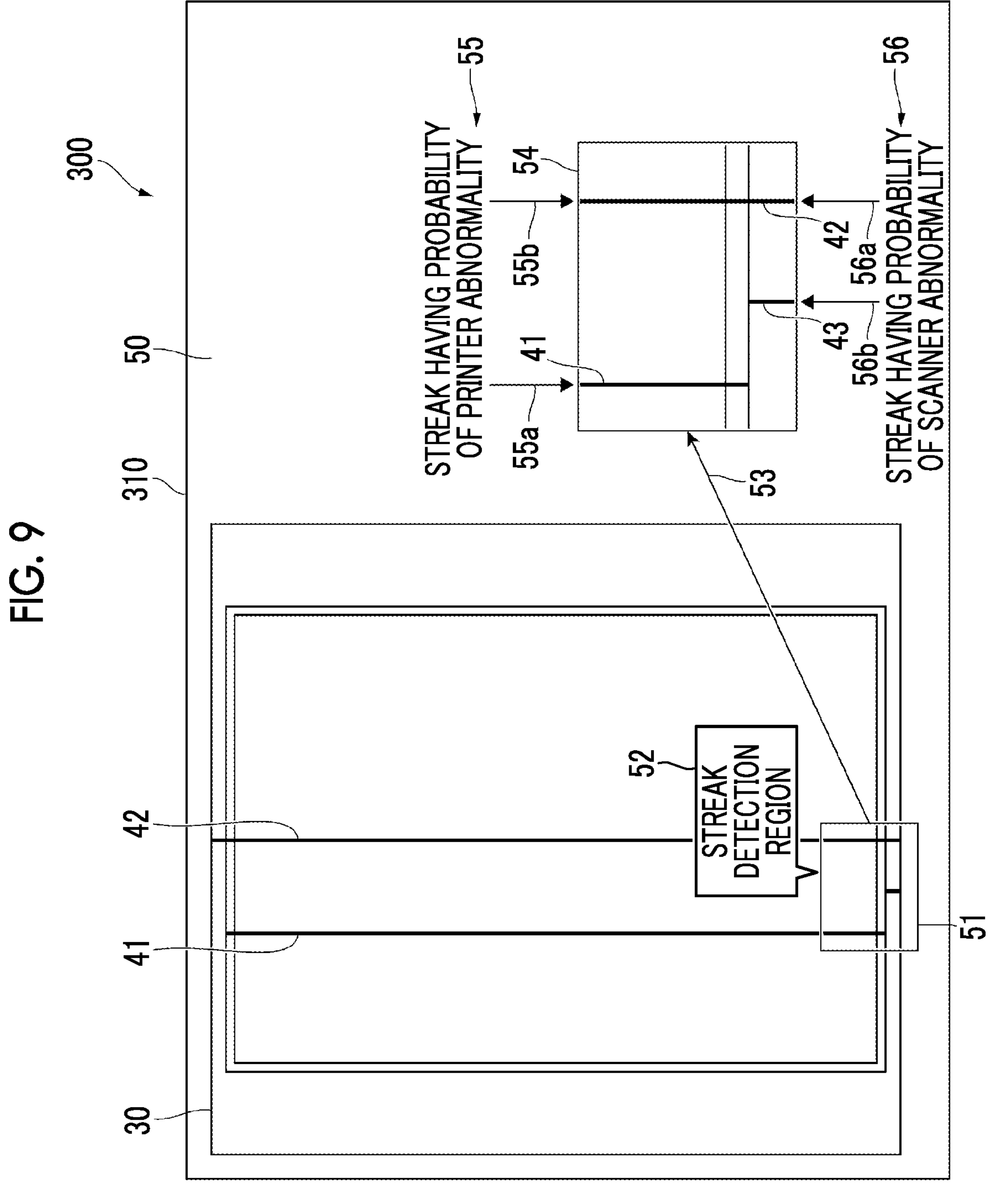
FIG. 9 is a diagram illustrating another example of the generation screen displayed on the display device of the user terminal.

FIG. 9 is a diagram illustrating another example of the generation screen 50 displayed on the display device 310 of the user terminal 300.

In the generation screen 50 illustrated in FIG. 8, in addition to the display illustrated in FIG. 8, the enlarged display portion 54 includes the description of the defective images 41 to 43. That is, on the generation screen 50, for the defective images 41 and 42, a display 55 indicating "a streak having a probability of a printer abnormality" is shown together with the arrows 55*a* and 55*b*. Further, for the defective images 42 and 43, a display 56 indicating "a streak having a probability of a scanner abnormality" is shown together with the arrows 56*a* and 56*b*. The displays 55 and 56 for the defective images 41 to 43 indicate the type of the defective images and indicate the causes of generating the defective images.

Figure 10:
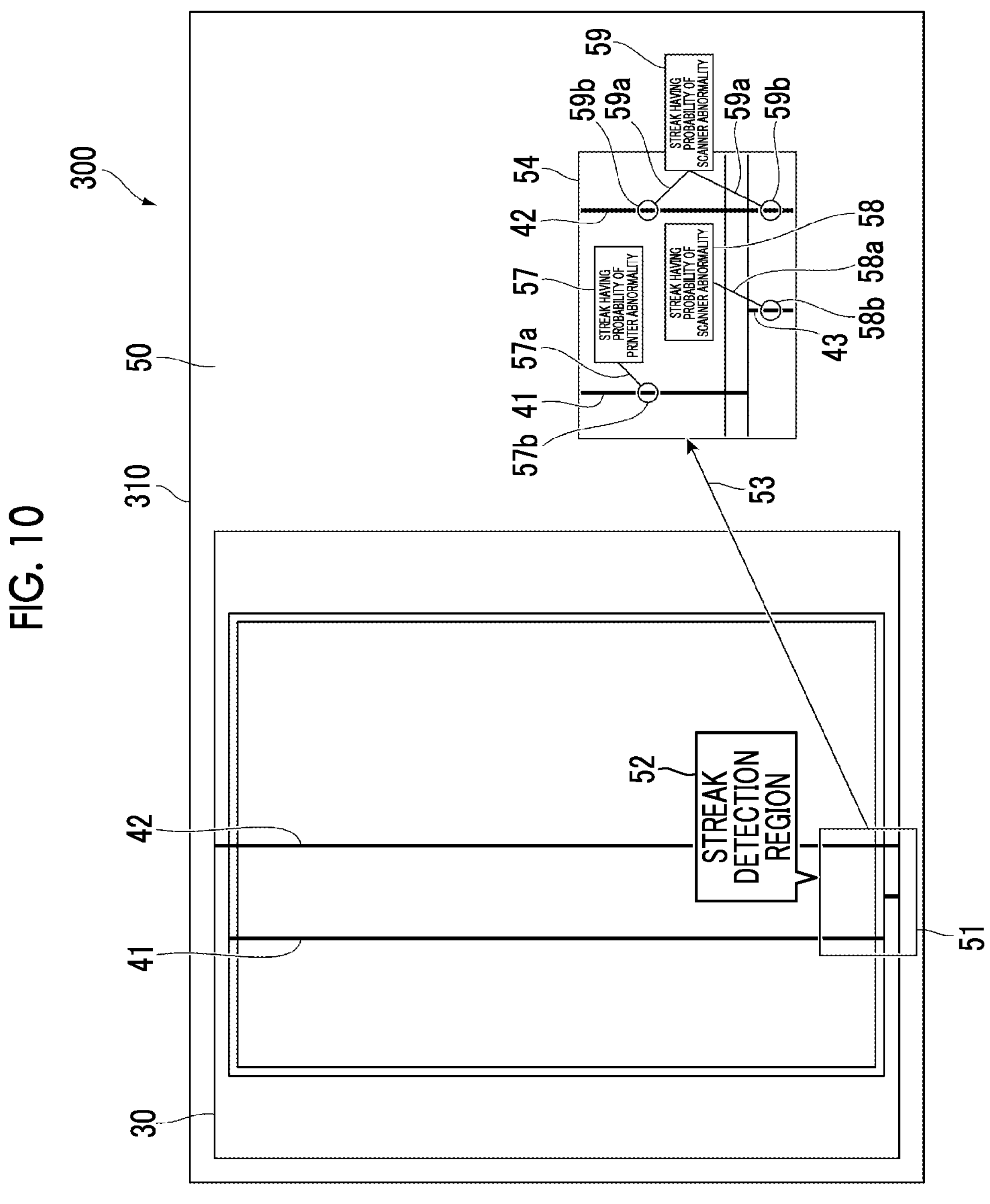
FIG. 10 is a diagram illustrating still another example of the generation screen displayed on the display device of the user terminal.

FIG. 10 is a diagram illustrating still another example of the generation screen 50 displayed on the display device 310 of the user terminal 300.

In addition to the display illustrated in FIG. 8, the generation screen 50 illustrated in FIG. 8 includes a description different from the case of FIG. 9. That is, on the generation screen 50, for the defective image 41, a display 57 indicating "a streak having a probability of a printer abnormality" is displayed together with a line 57*a* indicating that the display 57 is for the defective image 41 and a hollow circle FIG. 57*b* illustrated with being superimposed on the defective image 41.

Further, for the defective image 42, a display 59 indicating "a streak having a probability of a scanner abnormality" is displayed together with a line 59*a* indicating that the display 59 is for the defective image 42 and a hollow circle FIG. 59*b* illustrated with being superimposed on the defective image 42.

Further, for the defective image 43, a display 58 indicating "a streak having a probability of a scanner abnormality" is displayed together with a line 58*a* indicating that the display 58 is for the defective image 43 and a hollow circle FIG. 58*b* illustrated with being superimposed on the defective image 43.

As described above, in the example illustrated in FIG. 10, differing from the case of FIG. 9, each of the defective images 41 to 43 has been described individually, and the correspondence relationship can be easily grasped by using the circle FIGS. 57*b*, 58*b*, and 59*b*.

Second Exemplary Embodiment

Next, a second exemplary embodiment will be described. Regarding the second exemplary embodiment, the description of portions common to the portions in the first exemplary embodiment may be omitted.

Figure 11:
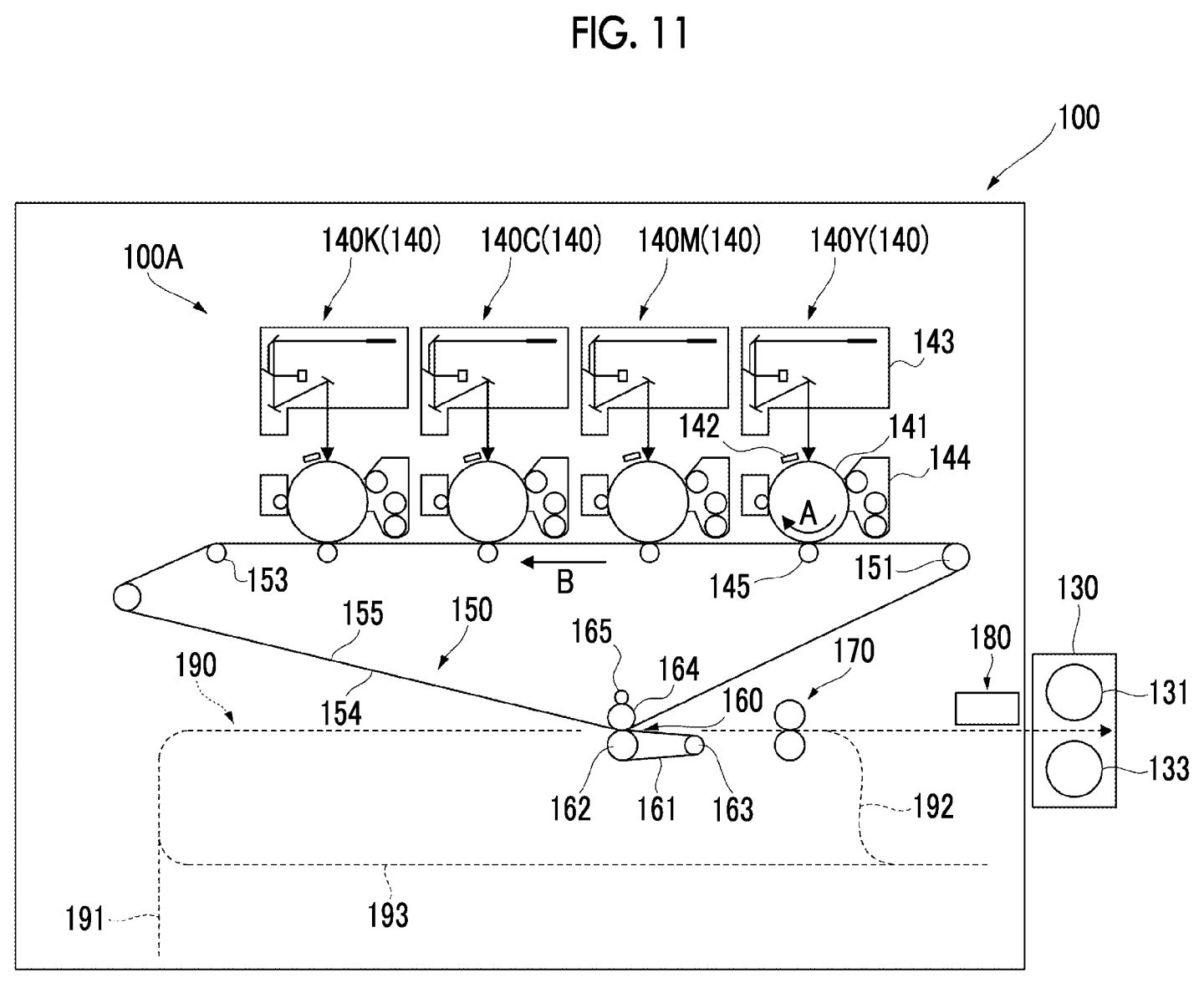

FIG. 11 is a diagram illustrating an image forming apparatus 100 according to the second exemplary embodiment.

The image forming apparatus 100 illustrated in FIG. 11 is an apparatus that forms an image on paper P. The image forming apparatus 100 is provided with an image forming unit 100A and a paper transport unit 190. The above-described image reading device 130 is disposed at a paper discharge position of the image forming apparatus 100.

The image forming unit 100A is provided with an image forming unit 11, an intermediate transfer belt 150, a secondary transfer unit 160, and a fixing device 170, and a post-processing unit 180.

In the present exemplary embodiment, four image forming units 140Y, 140M, 140C, and 140K corresponding to four colors of toners including yellow (Y), magenta (M), cyan (C), and black (K) respectively are provided as the image forming unit 140.

The image forming units 140Y, 140M, 140C, and 140K are arranged in a moving direction of the intermediate transfer belt 150 and form a toner image through an electrophotographic method.

Each of the image forming units 140Y, 140M, 140C, and 140K has a photoconductor drum 141, a charging unit 142, an exposure unit 143, a developing unit 144, and a primary transfer unit 145.

Each of the image forming units 140Y, 140M, 140C, and 140K forms a toner image of any color of YMCK and transfers the toner image onto the intermediate transfer belt 150.

Accordingly, a toner image in which the toner images of respective colors including YMCK overlap each other is formed on the intermediate transfer belt 150.

The photoconductor drum 141 rotates in an arrow A direction at a speed determined in advance. In addition, an electrostatic latent image is formed on a peripheral surface of the photoconductor drum 141.

The charging unit 142 charges the peripheral surface of the photoconductor drum 141 at a potential determined in advance.

The exposure unit 143 irradiates the charged peripheral surface of the photoconductor drum 141 with light and forms an electrostatic latent image on the peripheral surface of the photoconductor drum 141.

The developing unit 144 forms a toner image by attaching a toner to the electrostatic latent image formed on the peripheral surface of the photoconductor drum 141.

The primary transfer unit 145 transfers the toner image formed on the peripheral surface of the photoconductor drum 141 onto the intermediate transfer belt 150.

A voltage having a polarity opposite to a charging polarity of a toner is applied to the primary transfer unit 145. Accordingly, the toner image formed on the peripheral surface of the photoconductor drum 141 is sequentially electrostatically sucked onto the intermediate transfer belt 150, and one overlapping color toner image is formed on the intermediate transfer belt 150.

The intermediate transfer belt 150 is supported by a plurality of roller-shaped members. The intermediate transfer belt 150 is formed in an endless shape and circulates and moves in an arrow B direction. In addition, the intermediate transfer belt 150 includes an outer peripheral surface 154 and an inner peripheral surface 155.

The intermediate transfer belt 150 is used in transporting a toner image. In the present exemplary embodiment, a toner image is formed on the outer peripheral surface 154 of the intermediate transfer belt 150, and the toner image is transported to the secondary transfer unit 160 with the movement of the intermediate transfer belt 150.

In the present exemplary embodiment, a drive roller 151 that is driven by a motor (not illustrated) and drives the intermediate transfer belt 150 is provided as the roller-shaped member disposed inside the intermediate transfer belt 150. In addition, an idle roller 153 and a backup roller 164 that support the intermediate transfer belt 150 are provided as the roller-shaped members.

The roller-shaped members are rotatably provided and are pressed against the inner peripheral surface 155 of the intermediate transfer belt 150.

In the paper transport unit 190, a transport path 191 for taking out paper P from a paper storage unit (not illustrated) and transporting the paper P to the secondary transfer unit 160, a reversal path 192 that is branched between the fixing device 170 and the post-processing unit 180 and is for reversing the paper fixed by the fixing device 170 upside down, and a transport path 193 for guiding the paper P reversed on the reversal path 192 to the transport path 191 are provided.

In the case of two-sided printing, paper is transported through the reversal path 192 and the transport path 193.

The transport path 191 is formed such that the paper P fixed by the fixing device 170 is transported to the post-processing unit 180 and then discharged from the image forming apparatus 100. The paper P discharged from the image forming apparatus 100 passes through the image reading device 130.

The post-processing unit 180 referred to here is a device that executes, for example, a process of binding a bundle of paper, a process of folding the paper, a process of cutting the paper, a process of bookbinding, and the like. In the case of the chart paper CP, the chart paper CP is discharged without being post-processed, and the chart image 61 (for example, see FIG. 1) is read by the image reading device 130.

The image reading device 130 includes a reading unit 131 located on the upper side of a region through which the paper passes, and a reading unit 133 located on the lower side. In the case of single-sided printing, an image is read by the upper reading unit 131, and in the case of two-sided printing, images on both sides are read at once by the upper reading unit 131 and the lower reading unit 133.

The secondary transfer unit 160 includes a secondary transfer transport belt 161 disposed in contact with the outer peripheral surface 154 of the intermediate transfer belt 150. The secondary transfer transport belt 161 is a semi-conductive endless annular belt stretched by a drive roller (transfer roller) 162 consisting of metal, for example, SUS, and a driven roller 163 consisting of, for example, a rubber roller. The secondary transfer transport belt 161 is transported at a predetermined speed by the drive roller 162, and a tension predetermined by the drive roller 162 and the driven roller 163 is applied to the secondary transfer transport belt 161.

Further, the secondary transfer unit 160 is provided with the backup roller 164 that is disposed on the inner peripheral surface 155 side of the intermediate transfer belt 150 and forms a counter electrode of the secondary transfer transport belt 161, and a metal power feeding roller 165 that applies a secondary transfer bias to the backup roller 164.

The secondary transfer unit 160 configured in this manner transfers a toner image transported to the secondary transfer unit 160 by the intermediate transfer belt 150 onto the transported paper P.

The fixing device 170 is disposed on a downstream side of the secondary transfer unit 160 in a transport direction of the paper P. The fixing device 170 is provided with a fixing roller having a heating source and a pressurizing roller provided to face the fixing roller. The fixing device 170 melts an unfixed toner image on the paper P and fixes the toner image on the paper P. Accordingly, an image consisting of the toner image is formed on the paper P.

Next, in the case of the image forming apparatus 100 according to the second exemplary embodiment, determination as to whether the defective image appearing in the read image 30 is a scanner streak or a printer streak will be described with reference to FIG. 12. As described above, the image reading device 130 passes through both sides of the paper at a time, while the image forming unit 100A forms an image on each side in order. The sides of the chart paper CP are referred to as one side and the other side. In the case of single-sided printing, printing is performed on one side, and in the case of two-sided printing, printing is performed on one side and the other side.

FIG. 12 is a table showing determination results of defective images 44 and 45, and illustrates a defective image generation form in which the defective images 44 and 45 are respectively generated in the case of single-sided printing and the case of two-sided printing. In the horizontal column, an item indicating whether or not the two-sided printing is performed and an item for one side and the other side are provided for each item. In the vertical column, forms 1 to 5 are arranged in this order from the top as a defective image generation form.

As illustrated in FIG. 12, the read image 30 as a diagnosis target includes, for example, a region divided by four colors of Y (yellow), M (magenta), C (cyan), and K (black) in order from the top. The defective images 44 and 45 extend in a direction crossing this region. Both the defective images 44 and 45 illustrated in FIG. 12 are streak-shaped images along the reading direction (up-down direction in FIG. 12) of the image reading device 130. The defective image has mixed colors including four colors of Y (yellow), M (magenta), C (cyan), and K (black). The defective image 45 has the single color of any one of Y (yellow), M (magenta), C (cyan), or K (black).

In the case of two-sided printing, it is diagnosed whether or not there is a defect on each of the one side and the other side. Therefore, for example, the defective image 44 having the mixed colors may appear on either one side or the other side.

Form 1 as the defective image generation form illustrated in FIG. 12 is a case where the defective image 44 having the mixed colors appears on only one side, and the defective image 44 does not appear on the other side.

Form 2 is a case where the defective image 44 having the mixed colors appears only on the other side, and the defective image 44 does not appear on the one side.

In Forms 1 and 2, the defective image 44 as a scanner streak is generated. More specifically, in the case of Form 1, the defective image is formed due to the upper reading unit 131 (see FIG. 11) in the image reading device 130, and "scanner streak (reading unit 131)" is described in the item of the determination result. In the case of Form 2, the defective image is formed due to the lower reading unit 133, and "scanner streak (reading unit 133)" is described in the item of the determination result.

Form 3 is a case where the defective image 45 having a single color appears on each of one side and the other side, and the defective image 45 on one side and the defective image 45 on the other side have the same color. Since the defective image has a single color, the defective image 45 is generated before the image is transferred to the intermediate transfer belt 150 of the secondary transfer unit 160. That is, the defective image 45 is included in an image primarily transferred by the primary transfer unit 145 in the image forming units 140Y, 140M, 140C, and 140K.

In the case of Form 3, a printer streak is caused by any of the image forming units 140Y, 140M, 140C, and 140K corresponding to the color of the defective image 45. For example, in a case where the defective image 45 is yellow, a printer streak caused by the image forming unit 140Y is obtained, and "printer streak (Y color)" is described in the item of the determination result.

Here, comparing the read image 30 on one side of Form 1 and Form 3, since the defective image 44 appearing in Form 1 has mixed colors and the defective image 45 appearing in Form 3 has a single color, it is possible to determine whether the defect is the scanner streak or the printer streak, by using one read image.

More specifically, as described in the first exemplary embodiment, in a case where the read image 30 includes the out-of-paper image 32 in addition to the in-paper image 31, it is possible to determine whether the defect is a scanner streak or a printer streak. Further, by using a determination element of whether the defective image has a single color or mixed colors, it is possible to improve the accuracy of the determination.

Next, Forms 4 and 5 will be described.

Forms 4 and 5 are cases where the defective image 44 having the mixed colors appears on both one side and the other side in the case of two-sided printing. However, since it is difficult to determine the causes of Forms 4 and 5 only by using the read image 30 of two-sided printing, the read image 30 of single-sided printing is also used.

In Form 4, the defective image 44 of the mixed colors appears on both one side and the other side of the two-sided printing, and the defective image 44 of the mixed colors appears in the read image 30 of the single-sided printing. In Form 5, the defective image 44 of the mixed colors appears on both one side and the other side of the two-sided printing, and the defective image 44 does not appear in the read image 30 of the single-sided printing. In Forms 4 and 5, the defective image 45 of a single color does not appear in the read image 30 of the single-sided printing.

The defective image 44 of the mixed colors obtained by single-sided printing in Form 4 is different from the defective image 45 of the single color obtained by two-sided printing in Form 3, and is generated after the image is transferred to the intermediate transfer belt 150 of the secondary transfer unit 160 (see FIG. 11). Therefore, the defective image 44 of the single-sided printing in Form 4 is generated on the intermediate transfer belt 150 side in the secondary transfer unit 160.

On the other hand, since the defective image 44 does not appear in the single-sided printing in Form 5, the defective image 44 in the case of the two-sided printing is generated on the secondary transfer transport belt 161 (see FIG. 11) side in the secondary transfer unit 160.

In the cases of Forms 4 and 5, the determination result is obtained from the read image 30 indicated by the broken line frame in FIG. 12.

As described above, in Form 4, the "printer streak (intermediate transfer belt 150)" is described in the item of the determination result, and in Form 5, the "printer streak (secondary transfer transport belt 161)" is described in the item of the determination result.

In the second exemplary embodiment, a screen showing the determination result in the cases of Forms 1 to 5 is displayed on the display device 310 of the user terminal 300.

Here, in the second exemplary embodiment, the constituent components of the image forming unit 100A related to the defective image detected in the case of two-sided printing are presented. That is, in the case of the single-color defective image 45 in Form 3, it is assumed that the cause is any of the image forming units 140Y, 140M, 140C, and 140K, and the determination result is "printer streak (Y color)". Thus, the screen can include information regarding the image forming unit that forms an image of each color.

Further, in the case of the defective image 44 of the mixed colors in Forms 4 and 5, it is assumed that the cause is the secondary transfer unit 160 (see FIG. 11) that transfers the chart image 61 to the paper, and the determination results of Forms 4 and 5 can be included on the screen.

Further, in the case of single-sided printing, in a case where the defective image 44 is present on one side, the screen may include "printer streak (intermediate transfer belt 150)" as the determination result of Form 4. The determination result is an example of information indicating a portion of the secondary transfer unit 160 on the side where the image forming units 140Y, 140M, 140C, and 140K are located.

Further, in the case of single-sided printing, in a case where there is no defective image 44 on one side, the screen can include "printer streaks (secondary transfer transport belt 161)" as the determination result of Form 5. The determination result is an example of information indicating a portion of the secondary transfer unit 160 on an opposite side of the side on which the image forming units 140Y, 140M, 140C, and 140K are located.

In FIG. 12, the read image 30 shown in the item on one side is an example of a one-side image which is a diagnosis image formed on one side of the recording medium, and the read image 30 shown in the item on the other side is an example of an other-side image which is a diagnosis image formed on the other side of the recording medium.

Supplementary Note (((1)))

An information processing system comprising:

a processor configured to:

acquire a read image that is an image obtained in a manner that an image reading section reads a diagnosis image of a recording medium, which is output by an image forming section, the read image including a first range that is a range of the recording medium and a second range that is a range extending from the first range in a reading direction of the image reading section; and generate a screen including information regarding the image forming section in a case where a defective image is in the first range as a result of diagnosing the acquired read image, and including information regarding the image reading section in a case where the defective image is in the second range as the result of diagnosing the acquired read image.

(((2)))

The information processing system according to (((1))), wherein the screen is generated in a case where second range-included information that is information indicating that the read image includes the second range is acquired, in acquiring the read image.

(((3)))

The information processing system according to (((2))), wherein the second range-included information includes at least one of the information regarding the image reading section or information regarding the read image.

(((4)))

The information processing system according to (((1))), wherein the screen includes a partial image that is an image of a portion including the defective image in the read image.

(((5)))

The information processing system according to (((4))), wherein the partial image is an enlarged image of the portion including the defective image.

(((6)))

The information processing system according to (((4))) or (((5))), wherein the partial image includes a description of the defective image.

(((7)))

The information processing system according to (((6))), wherein the description of the defective image indicates a type of the defective image.

(((8)))

The information processing system according to (((6))), wherein the description of the defective image indicates a cause of generating the defective image.

(((9)))

The information processing system according to (((4))) or (((5))), wherein the partial image includes a figure for pointing a position of the defective image.

(((10)))

The information processing system according to (((4))) or (((5)))

wherein the screen is added to the partial image.

(((11)))

The information processing system according to any one of (((1))) to (((10))), wherein the screen includes information for prompting the image reading section to perform reading, in a case where the defective image is in the first range and the second range and a position of the defective image in the first range and a position of the defective image in the second range satisfy a predetermined condition.

(((12)))

The information processing system according to any one of (((1))) to (((11))), wherein, in a predetermined case and in a case where the defective image is in the second range, the screen is generated not to include the information regarding the image reading section.

(((13)))

The information processing system according to any one of (((1))) to (((12))), wherein, in a case where the processor acquires a one-side image that is a diagnosis image formed on one surface of the recording medium and an other-side image that is a diagnosis image formed on the other surface of the recording medium, and in a case where the acquired one-side image and other-side image include the defective image, the screen includes information regarding an image forming unit that forms an image of each color forming the diagnosis image in a case where the defective image in the one-side image and the other-side image has a single color, and includes information regarding a transfer unit that transfers the diagnosis image to the recording medium in a case where the defective image in the one-side image and the other-side image has mixed colors.

(((14)))

The information processing system according to (((13))), wherein, in a case where the defective image in the one-side image and the other-side image has mixed colors, the information regarding the transfer unit includes information indicating a portion of the transfer unit on a side on which the image forming unit is located in a case where the defective image is in the first range, and includes information indicating a portion of the transfer unit on a side opposite to the side on which the image forming unit is located in a case where there is no defective image in the first range.

(((15)))

A program causing an information processing apparatus to realize:

an acquisition function of acquiring a read image that is an image obtained in a manner that an image reading section reads a diagnosis image of a recording medium, which is output by an image forming section, the read image including a first range that is a range of the recording medium and a second range that is a range extending from the first range in a reading direction of the image reading section; and a generation function of generating a screen including information regarding the image forming section in a case where a defective image is in the first range as a result of diagnosing the read image acquired by the acquisition function, and including information regarding the image reading section in a case where the defective image is in the second range as the result of diagnosing the acquired read image.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing system comprising:

a processor configured to:

acquire a read image that is an image obtained in a manner that an image reading section reads a diagnosis image of a recording medium, which is output by an image forming section, the read image including a first range that is a range of the recording medium and a second range that is a range extending from the first range in a reading direction of the image reading section, wherein the reading direction is a direction in which the diagnosis of the recording medium is sequentially read as the recording medium is transported; and generate a screen including information regarding the image forming section in a case where a defective image is in the first range as a result of diagnosing the acquired read image, and generate another screen including information regarding the image reading section in a case where the defective image is in the second range as the result of diagnosing the acquired read image, wherein the another screen includes a notification to clean the image reading section in a case where the defective image is included in both the second range and the first range and a distance between a position between the defective image in the first range and a position between the defective image in the second range is less than a threshold.

2. The information processing system according to claim 1, wherein the screen is generated in a case where second range-included information that is information indicating that the read image includes the second range is acquired, in acquiring the read image.

3. The information processing system according to claim 2, wherein the second range-included information includes at least one of the information regarding the image reading section or information regarding the read image.

4. The information processing system according to claim 1, wherein the screen includes a partial image that is an image of a portion including the defective image in the read image.

5. The information processing system according to claim 4, wherein the partial image is an enlarged image of the portion including the defective image.

6. The information processing system according to claim 5, wherein the partial image includes a description of the defective image.

7. The information processing system according to claim 6, wherein the description of the defective image indicates a type of the defective image.

8. The information processing system according to claim 6, wherein the description of the defective image indicates a cause of generating the defective image.

9. The information processing system according to claim 5, wherein the partial image includes a figure for pointing a position of the defective image.

10. The information processing system according to claim 9, wherein, in a case where the defective image in the one-side image and the other-side image has mixed colors, the information regarding the transfer unit includes information indicating a portion of the transfer unit on a side on which the image forming unit is located in a case where the defective image is in the first range, and includes information indicating a portion of the transfer unit on a side opposite to the side on which the image forming unit is located in a case where there is no defective image in the first range.

11. The information processing system according to claim 4, wherein the partial image includes a description of the defective image.

12. The information processing system according to claim 11, wherein the description of the defective image indicates a type of the defective image.

13. The information processing system according to claim 11, wherein the description of the defective image indicates a cause of generating the defective image.

14. The information processing system according to claim 4, wherein the partial image includes a figure for pointing a position of the defective image.

15. The information processing system according to claim 4, wherein the screen is added to the partial image.

16. The information processing system according to claim 1, wherein the screen includes information for prompting the image reading section to perform reading, in a case where the defective image is in the first range and the second range and a position of the defective image in the first range and a position of the defective image in the second range satisfy a predetermined condition.

17. The information processing system according to claim 1, wherein, in a predetermined case and in a case where the defective image is in the second range, the screen is generated not to include the information regarding the image reading section.

18. The information processing system according to claim 1, wherein, in a case where the processor acquires a one-side image that is a diagnosis image formed on one surface of the recording medium and an other-side image that is a diagnosis image formed on the other surface of the recording medium, and in a case where the acquired one-side image and other-side image include the defective image, the screen includes information regarding an image forming unit that forms an image of each color forming the diagnosis image in a case where the defective image in the one-side image and the other-side image has a single color, and includes information regarding a transfer unit that transfers the diagnosis image to the recording medium in a case where the defective image in the one-side image and the other-side image has mixed colors.

19. A non-transitory computer readable medium a storing program causing an information processing apparatus to realize:

an acquisition function of acquiring a read image that is an image obtained in a manner that an image reading section reads a diagnosis image of a recording medium, which is output by an image forming section, the read image including a first range that is a range of the recording medium and a second range that is a range extending from the first range in a reading direction of the image reading section, wherein the reading direction is a direction in which the diagnosis of the recording medium is sequentially read as the recording medium is transported; and a generation function of generating a screen including information regarding the image forming section in a case where a defective image is in the first range as a result of diagnosing the read image acquired by the acquisition function, and a generation function of generating another screen including information regarding the image reading section in a case where the defective image is in the second range as the result of diagnosing the acquired read image, wherein the another screen includes a notification to clean the image reading section in a case where the defective image is included in both the second range and the first range and a distance between a position between the defective image in the first range and a position between the defective image in the second range is less than a threshold.

20. An information processing method comprising:

acquiring a read image that is an image obtained in a manner that an image reading section reads a diagnosis image of a recording medium, which is output by an image forming section, the read image including a first range that is a range of the recording medium and a second range that is a range extending from the first range in a reading direction of the image reading section, wherein the reading direction is a direction in which the diagnosis of the recording medium is sequentially read as the recording medium is transported; and generating a screen including information regarding the image forming section in a case where a defective image is in the first range as a result of diagnosing the acquired read image, and generating another screen including information regarding the image reading section in a case where the defective image is in the second range as the result of diagnosing the acquired read image, wherein the another screen includes a notification to clean the image reading section in a case where the defective image is included in both the second range and the first range and a distance between a position between the defective image in the first range and a position between the defective image in the second range is less than a threshold.

* * * * *